(12) United States Patent
Flučkiger et al.

(10) Patent No.: US 9,906,871 B2
(45) Date of Patent: Feb. 27, 2018

(54) METHOD FOR PROVIDING DISTANT SUPPORT TO A PERSONAL HEARING SYSTEM USER AND SYSTEM FOR IMPLEMENTING SUCH A METHOD

(75) Inventors: Markus Flučkiger, Bassersdorf (CH); Katarina Matthes, Stafa (CH); Jean Anne Jordan, Zurich (CH); Harald Krueger, Affoltern (CH)

(73) Assignee: Phonak AG, Staefa (CH)

( * ) Notice: Subject to any disclaimer, the term of this patent is extended or adjusted under 35 U.S.C. 154(b) by 161 days.

(21) Appl. No.: 14/236,306

(22) PCT Filed: Aug. 10, 2011

(86) PCT No.: PCT/EP2011/063777
§ 371 (c)(1),
(2), (4) Date: Apr. 25, 2014

(87) PCT Pub. No.: WO2013/020594
PCT Pub. Date: Feb. 14, 2013

(65) Prior Publication Data
US 2015/0296308 A1    Oct. 15, 2015

(51) Int. Cl.
*G06F 3/048* (2013.01)
*H04R 25/00* (2006.01)
(Continued)

(52) U.S. Cl.
CPC ......... *H04R 25/30* (2013.01); *G06F 3/04842* (2013.01); *H04L 67/141* (2013.01); *H04R 25/70* (2013.01); *H04R 2225/55* (2013.01)

(58) Field of Classification Search
None
See application file for complete search history.

(56) References Cited

U.S. PATENT DOCUMENTS 8,700,169 B1 * 4/2014 Chapa ................ A61N 1/36032
607/137
2011/0082520 A1    4/2011 McElveen, Jr.
(Continued)

FOREIGN PATENT DOCUMENTS

DE    19938318    3/2001
WO    WO 2010/066305    6/2010

OTHER PUBLICATIONS

International Search Report and Written Opinion received in International Application No. PCT/US2011/063777 dated Apr. 12, 2012.
(Continued)

*Primary Examiner* — William Trapanese
(74) *Attorney, Agent, or Firm* — ALG Intellectual Property, LLC

(57) ABSTRACT

Distant support is provided to a personal hearing system user by a support provider over a network. Support provider and user communicate with each other by speech transmitted over the network. The user depends in regard to understanding speech on his or her hearing aids. During the support session the hearing aids may have to be removed, may have to be switched off or may be programmed in an unfavorable way. In this case, the user may not be able to understand the speech of the support provider any more. The system enables the support provider to select a message from a list of available messages which is then presented as a visual image to the user. The obstructed acoustical channel is bypassed by relying on visual communication.

20 Claims, 2 Drawing Sheets

(51) Int. Cl.
*G06F 3/0484* (2013.01)
*H04L 29/08* (2006.01)

(56) References Cited

U.S. PATENT DOCUMENTS

| 2011/0176686 A1* | 7/2011 | Zaccaria | H04R 25/70 |
| | | | 381/60 |
| 2011/0257994 A1* | 10/2011 | Givens | G06F 19/3418 |
| | | | 705/2 |
| 2012/0095528 A1* | 4/2012 | Miller, III | A61N 1/36032 |
| | | | 607/57 |

OTHER PUBLICATIONS

"Skype", http://de.wikipedia/org/w/index.php?title=Skype&oldid=92212997&printable=yes as accessed on Mar. 20, 2012.
"New Skype Emoticons are Ugly and Creepy", http://ilovetoronto.com/toronto-real-estate/2011/08/new-skype-emoticons as accessed on Mar. 20, 2012.

* cited by examiner

METHOD FOR PROVIDING DISTANT SUPPORT TO A PERSONAL HEARING SYSTEM USER AND SYSTEM FOR IMPLEMENTING SUCH A METHOD

TECHNICAL FIELD

The invention relates to the field of personal hearing systems. More particularly, it relates to a method for supporting a user of such a system over a network such as the internet. Further, it relates to a system for implementing such a method.

BACKGROUND OF THE INVENTION

A personal hearing system is a system which relates to the hearing of a particular individual. It may comprise as main components one or two hearing aids, also denoted as hearing prostheses, external and/or implanted, serving for compensating a hearing loss. However, it may also comprise as main components hearing protectors against harmful noise, communication devices allowing individuals to speak to each other remotely, inconspicuously and/or in noisy environments or headsets which deliver and/or pick-up sound at the head of an individual. There may also be auxiliary components, such as remote controls, audio streaming devices, or fitting interface devices. Typically all components of a personal hearing system are designed such that they can be carried at least temporarily at the body of its user.

The configuration, use and maintenance of a personal hearing system requires much expertise, special devices and/or special software. Therefore, conventionally, the user visits the support provider.

It is known to replace such visits by distant support sessions. For example DE 199 38 318 A1 discloses a method for performing the fitting of a hearing aid over the internet.

SUMMARY OF THE INVENTION

It is an object of the invention to provide for a method and a system for providing distant support to a personal hearing system user by a support provider, wherein the provider can communicate with the personal hearing system user in a reliable manner.

This object is achieved by a method as defined in claim 1 and a system as defined in claim 13.

The invention is beneficial in that the support provider can communicate with the personal hearing system user even while the personal hearing system is removed from the ear, while it is switched off, while it is being reconfigured and/or after it has been reconfigured in an unfavorable way.

The method of claim 2 is beneficial in that a vocabulary of messages suitable to instruct a user during a distant support session is provided.

The method of claim 4 is beneficial in that it can be avoided that a personal hearing system user may be confused by images showing a generalized personal hearing system or a different model of personal hearing system model.

The method of claim 5 is beneficial in that it can be avoided that a support provider may be confused by a large number of available messages or may not be able to select them in a user friendly way.

The method of claim 7 is beneficial in that it can be avoided that an internet upload speed of a support provider may not be fast enough for sending images or moving images The method of claims 8 and 9 is beneficial in that it can be avoided that the plurality of available messages may not be sufficient.

The method of claim 10 is beneficial in that a bi-directional communication between a personal hearing system user and a support provider can be carried out while the personal hearing system is not fully functional.

Further embodiments and advantages emerge from the claims and the description referring to the figures.

BRIEF DESCRIPTION OF THE DRAWINGS

Below, the invention is described in more detail by referring to the drawings showing exemplified embodiments.

The described embodiments are meant as examples and shall not confine the invention.

DETAILED DESCRIPTION OF THE INVENTION

Figure 1:
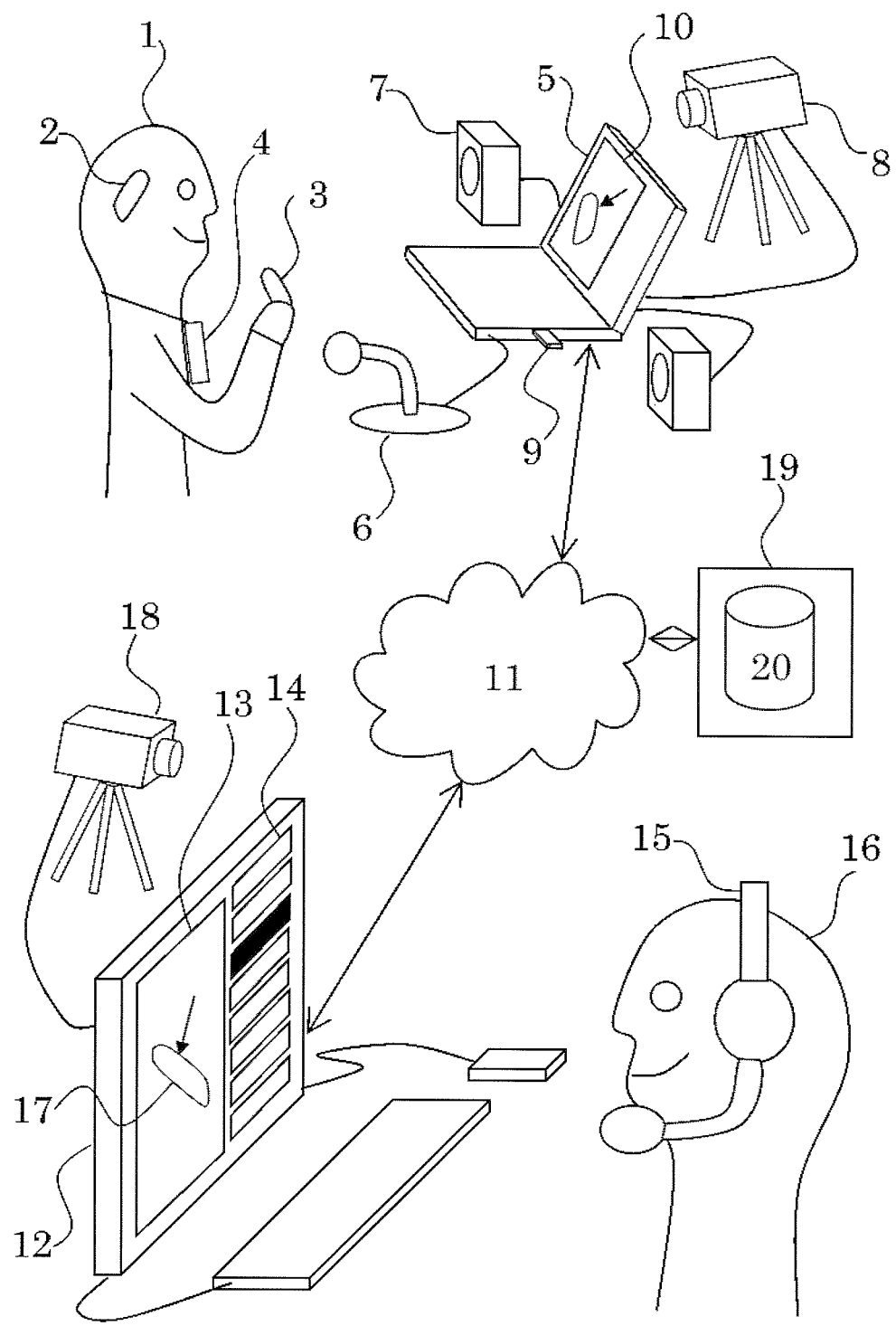
FIG. 1 is a block diagram of a system for providing distant support to a personal hearing device user by a support provider.

FIG. 1 shows a system for providing distant support to a personal hearing device user 1 by a support provider 16. The term "distant" hereinafter is to be understood as "at least in another room". Instead of "distant support" also the term "distance support" may be used. The personal hearing system in regard to which support is to be provided comprises a right hearing aid 2, a left hearing aid 3 and an auxiliary device 4. The left hearing aid 3 is shown removed from the ear. The auxiliary device 4 is communicating with the hearing aids 2, 3 and with a user computer 5. The user computer 5 is connected to the internet 11 and located at the personal hearing device user 1. The term "located at" in this context means not being distant, i.e. substantially at the same location, namely in the same room. The user computer 5 comprises a sound card, to which a microphone 6 and loudspeakers 7 are connected. Both can be regarded as equipment for providing hands free speech telecommunication for personal hearing system user 1 with a distant support provider 16. Alternatively, the speech signal of the support provider 16 may be streamed directly, non-acoustically, into the hearing aids 2, 3. The support provider 16 may be equipped with loudspeaker and microphone as well, or he or she may use, as shown, a headset 15. However, also conventional telephone equipment may be used for establishing a speech communication link between the user 1 and the support provider 16. With cameras 8 and 18 also a videotelephony may be implemented. Also connected to the internet 11 is a supporter computer 12 located at the support provider 16. Instead of the internet 11 an other network, as for example the telephone network, may be used. User computer 1 and supporter computer 12 may communicate directly. However, the communication may also be implemented over a relay server. Server 19 may be used as relay server. The support provider 16 can for example be an audiologist, an acoustician or an ENT-doctor. The user 1 may be assisted locally by a third person, for example a relative, a teacher, a caretaker or a nurse. The third person may help with handling the personal hearing system and operating the user computer 5. Further, the third person may help to test the personal hearing system simply by speaking, shouting or whispering, with or without covering his or her own mouth, to the user 1, who may then report how and how well such speech is perceived. The speech communication link between the user 1 and the support provider 16 may be fully or partially interrupted, for example when both hearing aids 2 and 3 are removed from the ear, when they are switched off, while they are being reconfigured and/or after they have been reconfigured in an unfavorable way. For this case the support provider 16 is provided with the possibility to send visual messages, thus bypassing the acoustic obstacles. A list of available messages 14 is displayed on supporter computer 12. A message may for example be selected by clicking on it with a mouse, by a keyboard shortcut or, in case of a touch-screen, by touching it. The list may show the actual message image. However, the list may also show only a simplification, name or description of the message. In this case the message image of the selected message 13 may be shown to the support provider 16. The message image may depict a hearing aid 17. The selected message 13 is sent to user computer 1 and displayed as a message image 10. The image may also be a moving image. Message images may also be stored in user computer 5 or in a database 20 on a server 19, which is also connected to the internet 11. In this case only a message identification may be sent by the supporter computer 12. The corresponding image or moving image is determined by user computer 5 or by the server 19 and sent to user computer 5. This solution has the advantage, especially in the case of moving images, that the internet connection of the support provider does not have to support large upload speeds.

The supporter computer 12, the headset 15 and the camera 18 form part of a support provider system.

The right hearing aid 2 and the left hearing aid 3 are ear-level hearing devices designed for compensating a hearing loss. Alternatively, only one side may be provided with such a device. Further, instead of the hearing aids, there may be one or two cochlear implants, each comprising implanted and external parts. Finally, there may be a so called bimodal fitting, i.e. a hearing aid on one side and a cochlear implant on the other side. The term "ear-level" means worn at the ear, i.e. behind the ear, in the ear, in the canal and/or implanted.

The auxiliary device 4 shown in the example functions as an interface device for bidirectional data exchange between one or two hearing aids 2, 3 and a user computer 5. The data may be in particular fitting data, for example signal processing parameter adjustment instructions and/or usage logging data. In a particular embodiment the auxiliary device 4 communicates with the hearing aids 2, 3 over a proprietary radio link and with the computer 5 over Bluetooth and/or universal serial bus (USB). The computer 5 may be equipped with a Bluetooth dongle 9. The auxiliary device 4 may have additional functionality, for example the functionality of a remote control for controlling the hearing aids 2, 3 or the functionality of a streaming device for streaming data from alternative audio sources such as audio players, phones, companion microphones or, as indicated above, speech of a distant support provider to hearing aids 2, 3. In an alternative embodiment the hearing aids 2, 3 may communicate directly with the user computer 5, such that the interface device may be omitted or may solely serve for the above mentioned additional functionalities. The auxiliary device 4 is preferably portable and suitable to be body-worn, for example like a medal on a necklace or in a pocket.

The user computer 5 can be a standard desktop type personal computer, a notebook, a net-book, a laptop, a tablet computer, a smart phone, a game or multi-media device, a set-top box or an enhanced remote control.

Figure 2:
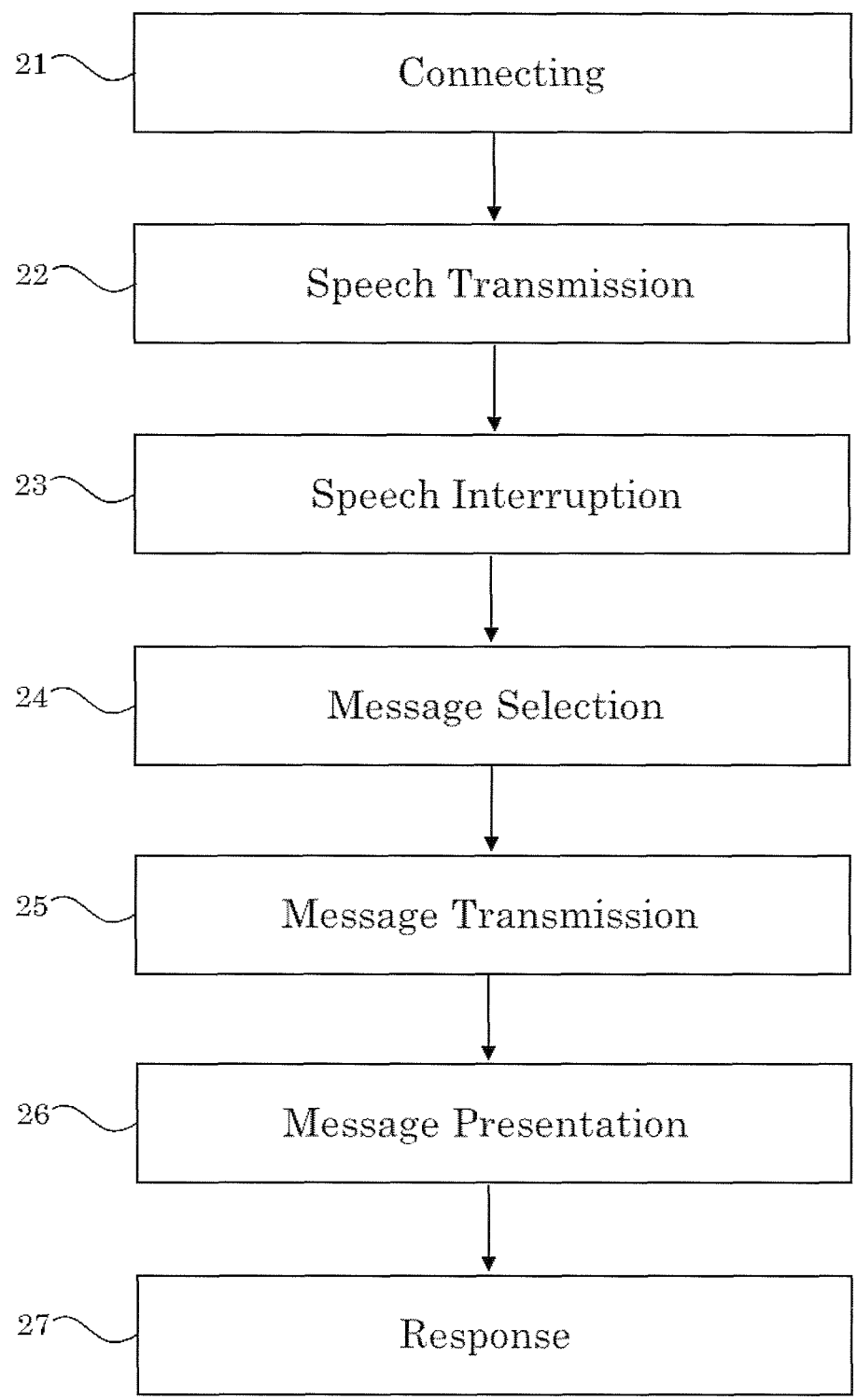
FIG. 2 is a flow diagram of actions in a distant support session.

FIG. 2 shows a flow diagram of actions in a distant support session in which support is provided by a support provider to a user of a personal hearing system in regard to this system.

In a first stage 21 a network connection is established between a user computer located at the user and a supporter computer located at the support provider by a network, in particular the internet.

In a second stage 22 speech of the support provider is transmitted over a network and over the personal hearing system to its user. The network used for the speech transmission may be a different network than the one used for interconnecting the computers, namely it may be the telephone network, while the computers are connected by the internet. The speech of the supporter may be picked up in various ways, for example by a conventional telephone handset, by a headset or by a microphone connected to the sound card of the supporter computer. The speech is presented to the personal hearing system user by the personal hearing system, in particular by a right hearing aid and a left hearing aid. The speech may be streamed directly, non-acoustically, to the hearing aids, either by auxiliary device 4 or directly by the user computer 5. However, the speech may also be sensed by the hearing aid microphones after being amplified by loudspeakers or it may be sensed by a t-coil in the hearing aids after being amplified by a conventional telephone handset.

In a third stage 23 the speech transmission between support provider and user is at least partially interrupted, in particular by removing, switching off and/or reconfiguring the personal hearing system. It is to be noted that the sending of visual messages during such an interruption is especially advantageous. However, visual messages may also be sent while the speech transmission is without interruption. For example visual messages may be sent automatically to inform the user about adjustment actions the support provider is performing in regard to the personal hearing system. Messages may also be sent to support verbal instructions of the support provider. Further, messages may be directed to a third person. The third person may not be engaged in the speech transmission between support provider and user, for example, when such a speech transmission is implemented based on a conventional telephone receiver, i.e. not with a speaker phone which allows third persons to listen in.

In a fourth stage 24 a plurality of messages is presented visually to the support provider. The support provider selects one of the messages, for example by clicking on it with a mouse. Messages may also be selected by typing in particular in combination with an autocomplete-feature. For example, when typing a particular letter, such as an "a", a list of messages starting with this letter would be presented. The plurality of messages may comprises at least three of the following messages:

insert hearing aid;
switch on hearing aid;
switch off hearing aid;
clean hearing aid;
clean parts of hearing aid;
change parts of hearing aid;
change battery of hearing aid;
check microphone protection of hearing aid;
check receiver protection of hearing aid;
operate volume control of hearing aid;
operate program toggle of hearing aid;
mount hearing aid for hearing aid self-test;
operate hearing aid (2, 3) for hearing aid self-test;
pair hearing aid with auxiliary device;

mount hook of hearing aid;
dismount hook of hearing aid;
mount ear-mold of hearing aid;
dismount ear-mold of hearing aid;
connect programming cable to hearing aid;
disconnect programming cable from hearing aid;
attach left/right-mark to hearing aid;
show left/right-mark on hearing aid;
perform feedback test for hearing aid;
put hearing aid in dry and/or storage case;
question how a stimulus presented by a hearing aid was perceived;
any of the above messages, but explicitly regarding only the right hearing aid;
any of the above messages, but explicitly regarding only the left hearing aid;
any of the above messages, but explicitly regarding both, the left and the right hearing aid;
an alert message;
adjust volume of user computer loudspeaker;
adjust position of user computer microphone;
a question to be answered acoustically
a question with multiple-choice answer;
a question with a set of check/uncheck answers;
a question with a free-text answer;
a message directed to a third person;
an instruction to provide a quiet environment, in particular by closing windows;
an instruction to make a particular sound;
an instruction to a third person to speak;
a custom message defined by said support provider;
one or more specifications of any of the above messages;

Preferably the plurality of visually presented messages is sorted by one or more of the following criteria:
by alphabet;
by overall usage count or statistic;
by context specific usage count or statistic;
by an estimated usage probability;
by a personal hearing system model;
by a personal hearing system configuration;
according to an order defined by the support provider.

The plurality of visually presented messages may be selected from a larger plurality by one or more of the following criteria:
relevance in the context of the current workflow stage;
relevance for said personal hearing system of said particular user;
according to a selection defined by the support provider.

The messages may be sorted in groups. There may be different groups for different support tasks. The messages and/or groups may be organized in a tree.

If the distant support comprises a hearing aid fitting the software for visually presenting the plurality of messages may be integrated with the fitting software. This has the advantage that the plurality of visually presented messages can be selected and/or sorted depending on the hearing aid fitting workflow stage, such as entering or updating personal hearing system user data in a client database, needs assessment, diagnostics and audiometry, choosing one or more devices, performing a first fitting, performing a follow-up fitting or fine-tuning, evaluating personal hearing system usage logging data, trouble-shooting, performing personal hearing system hardware tests and finally selecting replacement devices. For example during the stage fine-tuning, in particular treble fine-tuning, a message "make noise with keys" may be offered instructing the user to make such a noise to check if the treble amplification needs to be adjusted.

There may also be the possibility to define custom messages. For example, the support provider may record new images or moving images with a camera and may add text to it. Custom messages and corresponding images or moving images may be uploaded to a sever and thereby made available for use by further support providers. However, custom messages may also be defined in real-time during the actual support session thereby, when combined with a corresponding back-channel, implementing a chat functionality. A message typed on the supporter computer is immediately transmitted to and shown on the user computer.

In a fifth stage 25 the selected message and/or an identification of the selected message is sent over the network connection to the computer of the personal hearing system user.

In a sixth stage 26 the selected message is presented visually in the form of an image or moving image for perception by the personal hearing system user and/or a third person located at the user. The image or moving image may be one or more of the following:
a drawing;
a photography;
an animation;
a video;
a text;
an interactive presentation;

While the support provider may select a generic message such as "clean hearing aid", different images may be automatically associated with this message. In particular the image shown may depend on the particular model of hearing aid such as "Audéo S" or "Excélia Art". Acoustical coupling configurations such as "used with dome" or "used with custom ear-mold" may also be regarded in the selection of an image. Hearing aid model and configuration may be determined by reading data from the personal hearing system at the user-end or by reading fitting information from a fitting database, such as provided by the "Noah" software, at the support provider end.

The messages are preferably presented together with a picture of the support provider, in particular within a "speech bubble" originating from the picture.

Messages or message images may be "interactive" in the way that they comprise a sequence of instruction steps. In this case there may be user interface options "back"/"next" which may be offered to the support provider, to the personal hearing system user or to both of them. In this case there is preferably a synchronization between the message step shown on the support provider screen and the one shown on the personal hearing system user screen.

In an optional seventh stage 27 the user and/or a third person located at said user responds to the message. This will be in particular the case when the message comprises a question. The step of responding may comprise one or more of the following actions:
a user interface action on the user computer;
selecting a button, in particular by clicking on it;
selecting an acknowledge button;
selecting an answer button;
selecting an answer out of a choice of answers defined by the message;
selecting and/or unselecting, in particular checking and/or unchecking, items of a plurality of items, in particular a list of items, defined by said message;
typing a free-text answer;

speaking, in particular making use of an already existing speech transmission connection;
placing a telephone call to said support provider;
placing an internet voice and/or video call;
sending an internet chat message.

The response yielded by the responding is received by the support provider, in particular after transmission over the internet or the telephone network. It may be displayed on the screen of the supporter computer, preferably together with the originally sent message or question. The selection of a button on the user computer may for example be indicated to the support provider by showing the same button on the support computer turning red.

In a similar manner as the above mentioned answer buttons there may be a "help" button available for the personal system user and/or the third person. Selection of the help button by the user or the third person is signaled to the support provider. The help button may be available permanently, even if no message is presented, or only during selected and/or difficult support tasks and/or only in association with particular messages.

Preferably there is also an "alert client" button or feature available for the support provider. The alert-client button may be available permanently or only during certain stages of a support session, such as the beginning. When the alert-client button is selected a special message is transmitted shown as an image or moving image to the personal hearing system user. The message or message text may be requesting an acknowledgement. The acknowledgement may be possible by one or more of the above listed ways of responding. In a particular embodiment the message associated with alert-client button includes the telephone number of the support provider and instructs the client to place a telephone call to this number.

The invention claimed is:

1. A method for providing a distant support to a user of a personal hearing system by a support provider using a support provider system, said personal hearing system comprising at least one of a hearing aid and a cochlear implant, and said method comprising the steps of:
    establishing a network connection between a user computer located at said personal hearing system and a supporter computer forming part of said support provider system by a network;
    performing a speech transmission by transmitting speech of said support provider over said network or a further network and over said personal hearing system to said user;
    interrupting said speech transmission at least partially;
    determining a model and/or a configuration of said at least one of said hearing aid and said cochlear implant;
    visually presenting a plurality of messages via said supporter computer and receiving a selection of a message by said supporter computer from said plurality of messages, wherein said plurality of messages are related to use of said at least one of said hearing aid and said cochlear implant;
    transmitting said message and/or an identification of said message over said network connection; and
    visually presenting said message in the form of an image or a moving image by said user computer for perception by said user and/or a third person located at said user, wherein said image or said moving image visually depicts substantially said determined model and/or said configuration of said at least one of said hearing aid and said cochlear implant.

2. The method of claim 1, wherein said plurality of visually presented messages comprises at least three of the following messages:
    insert hearing aid;
    switch on/off hearing aid;
    clean hearing aid;
    change battery of hearing aid;
    change parts of hearing aid;
    check microphone protection of hearing aid;
    check receiver protection of hearing aid;
    operate volume control of hearing aid;
    operate program toggle of hearing aid;
    mount hearing aid for hearing aid self-test;
    operate hearing aid for hearing aid self-test;
    pair hearing aid with auxiliary device;
    mount/dismount hook of hearing aid;
    mount/dismount ear-mold of hearing aid;
    dismount ear-mold of hearing aid;
    connect programming cable to hearing aid;
    disconnect programming cable from hearing aid;
    attach left/right-mark to hearing aid;
    show left/right-mark on hearing aid;
    perform feedback test for hearing aid;
    put hearing aid in dry and/or storage case;
    question how a stimulus presented by a hearing aid was perceived;
    any of the above messages, but explicitly regarding only a right hearing aid;
    any of the above messages, but explicitly regarding only a left hearing aid;
    any of the above messages, but explicitly regarding both the left hearing aid and the right hearing aid;
    an alert message;
    adjust volume of user computer loudspeaker;
    adjust position of user computer microphone;
    a question to be answered acoustically;
    a question with multiple-choice answer;
    a question with a set of check/uncheck answers;
    a question with a free-text answer;
    a message directed to a third person;
    an instruction to provide a quiet environment, in particular by closing windows;
    an instruction to make a particular sound;
    an instruction to a third person to speak; and
    a custom message defined by said support provider.

3. The method of claim 1, wherein said image or said moving image is an interactive presentation.

4. The method of claim 1, wherein:
    said distant support comprises a hearing aid fitting; and
    software for presenting said plurality of visually presented messages is integrated with a fitting software, and/or said plurality of visually presented messages is selected and/or sorted depending on a hearing aid fitting workflow stage.

5. The method of claim 1, wherein said personal hearing system is designed to compensate a hearing loss and comprises one of the following:
    one hearing aid;
    two hearing aids;
    one cochlear implant;
    two cochlear implants; and
    one hearing aid and one cochlear implant.

6. The method of claim 1, wherein
    said identification of said message is sent by said supporter computer to a server, said server being connected to said network, said server storing a plurality of images and/or moving images associated with message identifications, said server sending an image and/or a moving image associated with said identification of said message to said user computer, and/or said identification of said message is sent by said supporter computer to said user computer, said user computer storing a plurality of images and/or moving images associated with message identifications.

7. The method of claim 1, further comprising the step of defining a custom message and a corresponding image or moving image by said support provider.

8. The method of claim 7, further comprising the step of uploading said custom message and said corresponding image or moving image to a server, thereby making it available for use by further support provider systems.

9. The method of claim 1, further comprising the steps of:
responding to said message by said user and/or said third person located at said user, said responding comprising one or more of the following:
a user interface action on said user computer;
selecting a button;
selecting an acknowledge button;
selecting an answer button;
selecting an answer out of a choice of answers defined by said message;
selecting or unselecting items out of one or more items defined by said message;
typing a free-text answer;
speaking;
placing a telephone call to said support provider;
placing an internet voice and/or video call;
sending an internet chat message; and
receiving a response yielded by said responding by said support provider.

10. The method of claim 1, wherein said network is the internet.

11. The method of claim 1, wherein said visually presenting of said plurality of messages via said supporter computer is performed after said interruption of said speech transmission at least partially.

12. The method of claim 11, wherein said interruption of said speech transmission at least partially comprises at least one of removing, switching off, and reconfiguring said personal hearing system.

13. The method of claim 1, wherein said plurality of messages visually presented via said supporter computer are prestored on said computer or on a remote server communicatively connected to said computer by way of said network or another network.

14. A system for providing a distant support to a user of a personal hearing system by a support provider, said personal hearing system comprising at least one of a hearing aid and a cochlear implant, and said system comprising at least one computer that:
establishes a network connection between a user computer located at said personal hearing system and a supporter computer forming part of a support provider system by a network;
performs a speech transmission by transmitting speech of said support provider over said network or a further network and over said personal hearing system to said user;
interrupts said speech transmission at least partially;
determines a model and/or a configuration of said at least one of said hearing aid and said cochlear implant;
visually presents a plurality of messages via said supporter computer and receives a selection of a message by said supporter computer from said plurality of messages, wherein said plurality of messages are related to use of said at least one of said hearing aid and said cochlear implant;
transmits said message and/or an identification of said message over said network connection;
visually presents said message in the form of an image or a moving image by said user computer for perception by said user and/or a third person located at said user, wherein said image or said moving image visually depicts substantially said determined model and/or said configuration of said at least one of said hearing aid and said cochlear implant.

15. The system of claim 14, wherein said plurality of visually presented messages comprises at least three of the following messages:
insert hearing aid;
switch on/off hearing aid;
clean hearing aid;
change battery of hearing aid;
change parts of hearing aid;
check microphone protection of hearing aid;
check receiver protection of hearing aid;
operate volume control of hearing aid;
operate program toggle of hearing aid;
mount hearing aid for hearing aid self-test;
operate hearing aid for hearing aid self-test;
pair hearing aid with auxiliary device;
mount/dismount hook of hearing aid;
mount/dismount ear-mold of hearing aid;
dismount ear-mold of hearing aid;
connect programming cable to hearing aid;
disconnect programming cable from hearing aid;
attach left/right-mark to hearing aid;
show left/right-mark on hearing aid;
perform feedback test for hearing aid;
put hearing aid in dry and/or storage case;
question how a stimulus presented by a hearing aid was perceived;
any of the above messages, but explicitly regarding only a right hearing aid;
any of the above messages, but explicitly regarding only a left hearing aid;
any of the above messages, but explicitly regarding both the left hearing aid and the right hearing aid;
an alert message;
adjust volume of user computer loudspeaker;
adjust position of user computer microphone;
a question to be answered acoustically;
a question with multiple-choice answer;
a question with a set of check/uncheck answers;
a question with a free-text answer;
a message directed to a third person;
an instruction to provide a quiet environment, in particular by closing windows;
an instruction to make a particular sound;
an instruction to a third person to speak; and
a custom message defined by said support provider.

16. The system of claim 14, wherein:
said distant support comprises a hearing aid fitting; and
software for presenting said plurality of visually presented messages is integrated with a fitting software, and/or said plurality of visually presented messages is selected and/or sorted depending on a hearing aid fitting workflow stage.

17. The system of claim 14, wherein said personal hearing system is designed to compensate a hearing loss and comprises one of the following:

one hearing aid;
two hearing aids;
one cochlear implant;
two cochlear implants; and
one hearing aid and one cochlear implant.

18. The system of claim 14, wherein
said identification of said message is sent by said supporter computer to a server, said server being connected to said network, said server storing a plurality of images and/or moving images associated with message identifications, said server sending an image and/or a moving image associated with said identification of said message to said user computer, and/or
said identification of said message is sent by said supporter computer to said user computer, said user computer storing a plurality of images and/or moving images associated with message identifications.

19. The system of claim 14, wherein said visually presenting of said plurality of messages via said supporter computer is performed after said interruption of said speech transmission at least partially.

20. The system of claim 19, wherein said interruption of said speech transmission at least partially comprises at least one of removing, switching off, and reconfiguring said personal hearing system.

\* \* \* \* \*